United States Patent [19]

Bauer et al.

[11] Patent Number: 5,258,756
[45] Date of Patent: Nov. 2, 1993

[54] APPARATUS AND METHOD FOR DISPLAYING ENERGY MANAGEMENT CIRCLES ON DISPLAYS FOR ELECTRONIC FLIGHT INSTRUMENT SYSTEMS

[75] Inventors: Lyal H. Bauer, Robins; Scott F. Bauler, Hiawatha, both of Iowa

[73] Assignee: Rockwell International Corporation, Seal Beach, Calif.

[21] Appl. No.: 522,281

[22] Filed: May 11, 1990

[51] Int. Cl.⁵ ............................................. G01C 21/00
[52] U.S. Cl. ..................................... 340/971; 340/945
[58] Field of Search ............... 340/945, 970, 971, 977, 340/995, 722, 731; 364/439, 442, 433, 428, 521; 244/186; 73/178 T; 358/103

[56] References Cited

U.S. PATENT DOCUMENTS

| | | | |
|---|---|---|---|
| 3,347,092 | 10/1967 | Stutson | 364/442 |
| 4,302,755 | 11/1981 | Pisani et al. | 340/722 |
| 4,463,427 | 7/1984 | Bonnetain et al. | 364/442 |
| 4,825,374 | 4/1989 | King et al. | 364/433 |
| 4,977,401 | 12/1990 | Sjöberg | 340/975 |
| 5,012,433 | 4/1991 | Callahan et al. | 364/521 |

*Primary Examiner*—Brent Swarthout
*Attorney, Agent, or Firm*—Gregory G. Williams; M. Lee Murrah; H. Fredrick Hamann

[57] ABSTRACT

An improved method and apparatus for drawing energy management circles on electronic flight instrument system displays which includes a microprocessor for making several initial inquiries regarding the orientation of the circle with respect to the display and issuing write or don't write commands for each point on the circle without the need for individually analyzing each point as to whether it is located on the display screen.

6 Claims, 2 Drawing Sheets

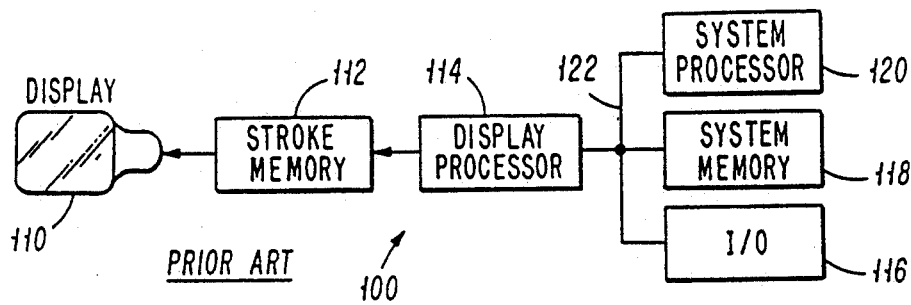
FIG. 1 PRIOR ART
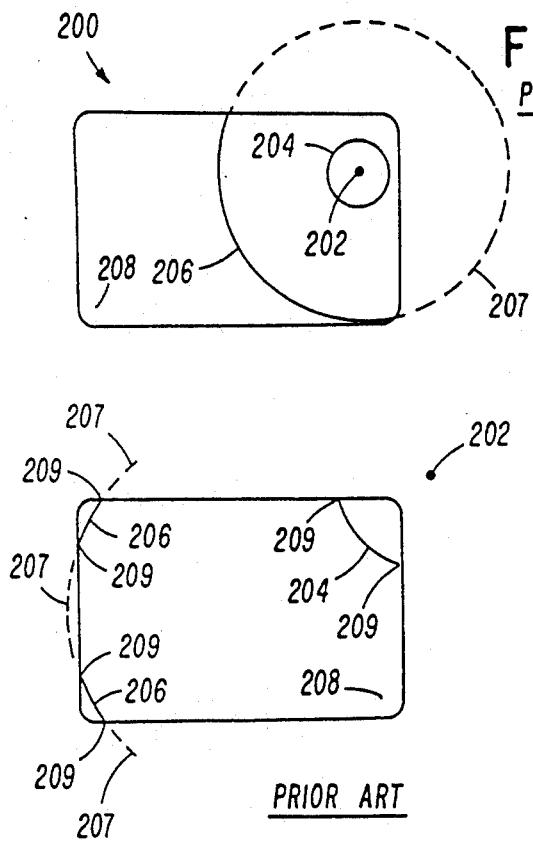
FIG. 2A PRIOR ART
FIG. 2B PRIOR ART
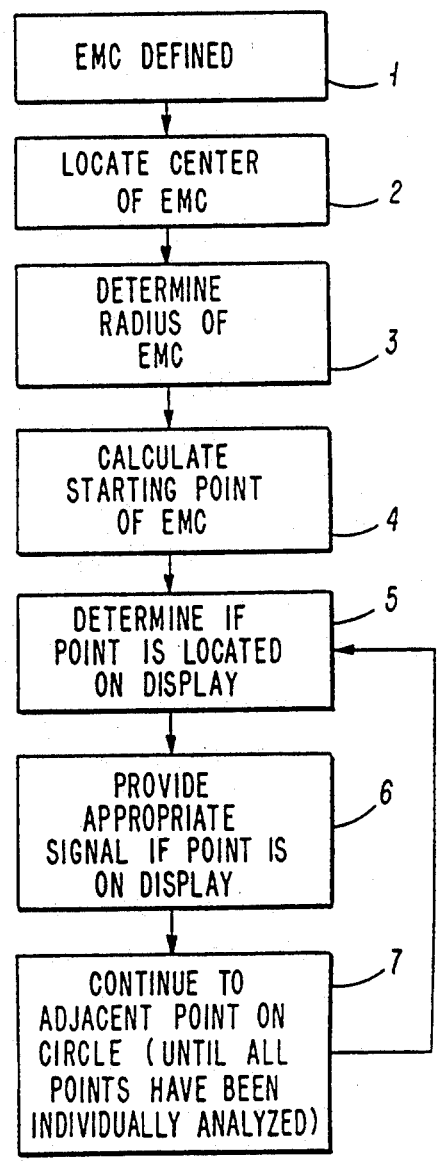
FIG. 3 PRIOR ART

APPARATUS AND METHOD FOR DISPLAYING ENERGY MANAGEMENT CIRCLES ON DISPLAYS FOR ELECTRONIC FLIGHT INSTRUMENT SYSTEMS

BACKGROUND OF THE INVENTION

The present invention relates to electronic flight instrument systems and more particularly relates to display devices showing energy management circles (EMCs), and even more particularly concerns an improved apparatus and method for displaying high quality energy management circles on electronic flight instrument systems (EFIS).

In today's aviation industry, it is desirable for aircraft owners and operators to minimize fuel consumption whenever possible. In the past, energy management circles have been proposed to assist pilots in performing economical aircraft descents. These energy management circles have also been proposed for providing pilots with crucial information regarding landing decisions.

While these energy management circles have been appreciated as sources of valuable flight information, there has existed some serious drawbacks in their implementation. Typically, the energy management circles have been annoying to pilots, due to the excessive "ratcheting" of the circles as they move across the display.

Consequently there exists a need for an improved method and apparatus for displaying energy management circles on EFIS displays which result in improved display characteristics.

SUMMARY OF THE INVENTION

It is an object of the present invention to provide pilots with valuable information in a non-annoying fashion.

It is a feature of the present invention to include apparatus and method for displaying energy management circles on EFIS displays which are capable of quick generation and calculation.

It is an advantage of the present invention to eliminate the "ratcheting" of energy management circles across the EFIS displays.

The present invention provides a method and apparatus for generating energy management circles for EFIS displays which was designed to satisfy the aforementioned needs, achieved the above described objects, include the earlier mentioned features and produce the previously stated advantages. The invention is carried out in an "intermediate inquiry-less" system, in the sense that, the typical intermediate inquiries made regarding each intermediate line point have been eliminated. Instead, several initial inquiries about the orientation of the energy management circles in relation to the display are made, and then the intermediate line points are drawn without the need for individual, display or non-display, inquiries for each intermediate line point.

Accordingly, the present invention relates to an improved method and apparatus for drawing energy management circles on EFIS displays where the circles are drawn rapidly after several initial inquiries are made which relate to the circle orientation with respect to the viewing area boundaries.

Circles are drawn in response to changes in radius. The new circles must be clipped to the edge of the display to prevent unacceptable circle reflection on the display.

BRIEF DESCRIPTION OF THE DRAWINGS

The invention may be more fully understood by reading the following description of the preferred embodiments of the invention in conjunction with appended drawings FIG. 1 is an EFIS of the prior art which shows the display device and associated control hardware.

FIG. 2A is a display device of the prior art showing two energy management circles thereon where the intermittent lines represent portions of the circles not appearing on the display device.

FIG. 2B is a display device of the prior art (similar to 2A) except that the energy management circles have larger radii and are focused around a point outside the display device.

FIG. 3 is a flow chart of a prior art technique for determining energy management circles to be displayed.

DETAILED DESCRIPTION OF THE PREFERRED EMBODIMENTS

Figure 4:
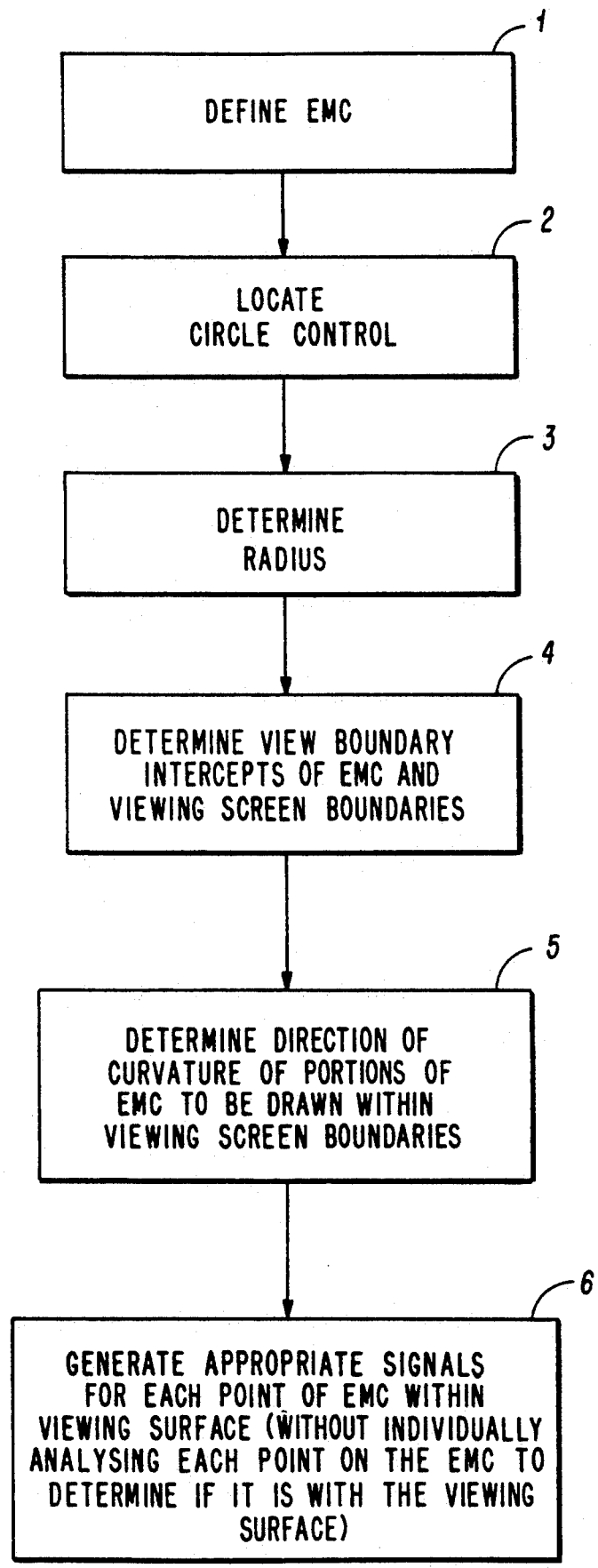
FIG. 4 is a flow chart of a preferred embodiment of the present invention.

Now referring to FIG. 1, there is shown a display system of the prior art, generally designated 100, which includes a display device 110 which may be a CRT, TFEL, LCD or any other video type display. Also included in system 100 is system processor 120 and system memory 118, both of which are well known in the art. In a preferred embodiment the system processor may be an Intel 80186 microprocessor. Input/output 116 which may be provided in several well known forms including but not limited to a flight management system or in cockpit pilot controls is also shown. The information from the flight management system or the cockpit controls are input through I/0 116 to system bus 122 where the information is then manipulated by display processor 114 and system processor 120 to generate display commands which are stored in the stroke memory 112 prior to being provided to display 110. Display processor 114 is well known in the art and in a preferred embodiment may be an Intel 80186 micro processor.

The I/O 116 is capable of defining energy management circles while the system processor 120 is capable of determining which segments of the energy management circles will be ultimately displayed by 110.

Now referring to FIG. 2, there is shown a display device 200 having an interior energy management circle 204 and an exterior management circle 206 disposed about a center point 202. The circle 204 is shown as being completely displayed on the viewing surface 208 while the circle 206 has a segment 207 (shown by the dashed line) which is beyond the viewing area 208.

Now referring to FIG. 2B there is shown a display device 200 having a first energy management circle 204 and a second energy management circle 206 surrounding a central point 202 which is located outside of the display 200. Energy management circle 206 has two segments which appear on the viewing screen 208 while energy management circle 204 has only one. Also, shown are view boundary intercepts 209.

Now referring to FIG. 3, there is shown a flow chart diagram of a prior art method for displaying energy management circles.

Firstly, the energy management circle is defined, by the I/O 116 (FIG. 1).

Secondly, the center of the EMC is located by system processor 120 (FIG. 1).

Thirdly, the system processor calculates the radius for the energy management circle.

Fourthly, the system processor calculates a starting point on the energy management circle.

Fifthly, the system processor determines whether the point is located on the display device 110.

Sixthly, the system processor determines if the point is on the display and if so provides the appropriate video or deflection (x,y) signal through stroke memory 112 to display 110 and if the point is not to be displayed then the appropriate video or deflection signal is output to display 110.

Seventhly, the process continues by individually analyzing the point adjacent to the previous point on the circle until all points have been analyzed.

This inquiry into whether or not each individual point on the circle is to be displayed on the display is CPU intensive and greatly affects the overall speed in which an energy management circle can be drawn and consequently updated.

Now referring to FIG. 4, there is shown a flow chart of the method of the present invention.

Firstly, the energy management circle is defined by a flight management system of the I/O 116 (FIG. 1).

Secondly, the system processor 120 then locates the center of the energy management circle.

Thirdly, the system processor determines the radius of the energy management circle.

Fourthly, the system processor determines view boundary intercepts of the energy management circle and the display boundaries.

Fifthly, the system processor 114 determines whether the circle is concave or convex.

Sixthly, the circle segments within the display boundary intercepts are drawn without the need for individual determination of whether each point in the segment is located on the display.

A more thorough understanding of present invention may be obtained by reviewing the ada source code of the appendix which is implemented by the system processor 120 to essentially perform the following steps:

```
Convert EM circle radius from a fraction of 512 nm to a fraction of the Earth's radius.

Calculate the EM circle radius of curvature based on mode.

Determine the coordinates and Cartesian angle of the most northerly point on the EM circle (this will be our point of reference for drawing).

If the EM circle center is in view and the circle radius is less than or equal to the distance from the screen center to the screen corners, we can draw the entire circle without worrying about it going into the wrap-around region then The start point will be the most northerly point on the EM circle.

elsif the EM circle can be particularly in view then

Determine Em_Radius_Fer_Sqd and set Number_Of_Intcpts to zero.

Determine points where EM circle intercepts bottom of view boundary.

if Intercept is less than Zero then

Set Bottom Left and Right intercept to Invalid.

else

Determine Bottom Left and Right intercept points.

If Bottom intercept is at the left boundary of viewspace then

Set Bottom Left intercept to Valid.
```

Increment number of Intercept points.
    else
        Set Bottom Left intercept to invalid.
    end if
    If Bottom intercept is at the right boundary of viewspace then
        Set Bottom Right intercept to Valid.
        Increment number of Intercept points.
    else
        Set Bottom Right intercept to invalid.
    end if
end if Determine points where EM circle intercepts left side of
    view boundary.
if Intercept is less than zero then
    Set Left Top and Bottom intercept to Invalid.
else
    Determine Left Top and Bottom intercept points.
    If Left side Bottom intercept is at the bottom boundary
            of viewspace then
        Set Left Bottom intercept to Valid.
        Increment number of Intercept points.
    else
        Set Left Bottom intercept to invalid.
    end if
    If Left side Top intercept is at the bottom boundary
            of viewspace then
        Set Left Top intercept to Valid.
        Increment number of Intercept points.
    else Set Left Top intercept to invalid.

end if end if

Determine points where EM circle intercepts right
side of view boundary.

if Intercept is less than Zero the

Set Right Top and Bottom intercept to Invalid.

else

Determine Right Top and Bottom intercept points.

If Right side Bottom intercept is at the bottom boundary
of viewspace then

Set Right Bottom intercept to Valid.

Increment number of Intercept points.

else

Set Right Bottom intercept to invalid.

end if

If Right side Top intercept is at the bottom boundary
of viewspace then

Set Right Top intercept to Valid.

Increment number of Intercept points.

else

Set Right Top intercept to invalid.

end if end if

Determine points where EM circle intercepts top of
view boundary.

if Intercept is less than Zero then

Set Top Left and Right intercept to Invalid.

```
else
    Determine Right Top and Bottom intercept points.
    If Top side Left intercept is at the left boundary
            of viewspace then
        Set Top Left intercept to Valid.
        Increment number of Intercept points.
    else
        Set Top Left intercept to invalid.
    end if If Top side Right intercept is at the right boundary
            of viewspace then
        Set Top Right intercept to Valid.
        Increment number of Intercept points.
    else
        Set Top Right intercept to invalid.
    end if
end if If the EM circle intercepts the view boundary at any point then
    Set Em Arc 1 Valid to True
        Previous logic takes care of all cases where the EM
        circle intercepts the view boundary at more than four
        points, so, if we get here, we only need to draw a
        subarc of the EM circle. The first step is to
        determine the start point for the subarc. If the
        most northerly point on the EM circle is in view, we
        will start drawing there in order to prevent
        ratcheting, otherwise, we will start drawing at a
        view boundary intercept point.
    Determine Start Em North point.
```

```
If the EM circle intercepts the view boundary at
    four points then
    if Bottom Left and Right Intercept is Valid then
        Set Bottom Left and Right Intercept to invalid
        if not Start At Em North then
            if the most northerly point on the EM circle
                    is between the two intercepts then
                Start drawing at the most northerly point
            end if
        end if
    elsif Left Bottom and Top intercept is Valid then
        Set Left Bottom and Top intercept to invalid
        if not Start At Em North then
            if the most northerly point on the EM circle
                    is between the two intercepts then
                Start drawing at the most northerly point
            end if
        end if elsif Right Bottom and Top intercept is Valid then
        Set Right Bottom and top intercept to invalid
        if not Start At Em North then
            if the most northerly point on the EM circle
                    is between the two intercepts then
                Start drawing at the most northerly point
            end if
        end if
    elsif Top Left and Right intercept is Valid then
        Set Top Left and Right intercept to invalid
        if not Start_At_Em_North then
```

```
                    if the most northerly point on the EM circle
                        is between the two intercepts then
                        Start drawing at the most northerly point
                    end if
                end if
            end if
        end if
    end if -- Calculate the Cartesian angles of the intercept points (with
    -- respect to the center of the EM circle).
    if Bottom Left Intercept is Valid then
        Determine Bot_Intcpt_L_Angle
        if Bottom Right Intercept is Valid then
            Determine Bot Intcpt_R_Angle
        end if
    elsif Bottom Right Intercept is Valid then
        Determine Bot_Intcpt_R_Angle
    end if if Left Bottom Intercept is Valid then
        Determine Left_Intcpt_B_Angle
        if Left Top Intercept Valid then
            Determine Left_Intcpt_T_Angle
        end if
    elsif Left_Intcpt_T_Valid then
        Determine Left_Intcpt_T_Angle
    end if if Right Bottom Intercept is Valid then
        Determine Right_Intcpt_B_Angle
```

```
       if Right Top Intercept is Valid then
           Determine Right_Intcpt_T_Angle
       end if
   elsif Right Top Intercept is Valid then
       Determine Right_Intcpt_T_Angle
   end if if Top Left Intercept is Valid then
       Determine Top_Intcpt_L_Angle
       if Top Right Intercept is Valid then
          Determine Top_Intcpt_R_Angle
       end if
   elsif Top Right Intercept is Valid then
       Determine Top_Intcpt_R_Angle
   end if
       Determine angular period.
       if Start At Em North then
           -- Determine where to draw arc clockwise from most
           -- northerly point of EM circle.
           --
           -- Calculate arc length using the following formula:
           --         ARC LENGTH = RADIUS * THETA * PI
           Set Em Arc 2 Valid to True if quadrant 1 then
              Determine Arc 1 length in Fraction of Earth Radius (Fer)
           elsif quadrant 2 then
              Determine Arc 1 length in Fraction of Earth Radius (Fer)
           elsif quadrant 3 then
              Determine Arc 1 length in Fraction of Earth Radius (Fer)
```

```
         else -- quadrant 4

Determine Arc 1 length in Fraction of Earth Radius (Fer)

end if

-- Determine where to draw arc which lies counter-

-- clockwise from most northerly point of EM circle.

if quadrant 1 then

Clip EM circle arc.

elsif quadrant 2 then

Clip EM circle arc.

elsif quadrant 3 then

Clip EM circle arc.

else -- quadrant 4

Clip EM circle arc.

end if else

-- The most northerly point of the EM circle is far out of view,

-- so we will start drawing at one of the intercept points.

Set Em Arc 2 Valid to False if Bot_Intcpt_L_Valid then if Left_Intcpt_B_Valid then Clip EM circle arc.

elsif Top_Intcpt_L_Valid then

Clip EM circle arc.

elsif Right_Intcpt_T_Valid then

Clip EM circle arc.

elsif Bot_Intcpt_R_Valid then

Clip EM circle arc.

end if elsif Left_Intcpt_B_Valid then
```

```
           if Right_Intcpt_B_Valid then
              Clip EM circle arc.
           elsif Top_Intcpt_R_Valid then
              Clip EM circle arc.
           elsif Left_Intcpt_T_Valid then
              Clip EM circle arc.
           end if
        elsif Left_Intcpt_T_Valid then
           if Top_Intcpt_L_Valid then
              Clip EM circle arc
           elsif Right_Intcpt_T_Valid then
              Clip EM circle arc.
           elsif Bot_Intcpt_R_Valid then
              Clip EM circle arc.
           end if
        elsif Top_Intcpt_L_Valid then
           if Right_Intcpt_B_Valid then
              Clip EM circle arc.
           elsif Top_Intcpt_R_Valid then
              Clip EM circle arc.
           end if
        elsif Top_Intcpt_R_Valid then
           if Right_Intcpt_T_Valid then
              Clip EM circle arc.
           elsif Bot_Intcpt_R_Valid then
              Clip EM circle arc.
           end if
        elsif Right_Intcpt_T_Valid then
           if Right_Intcpt_B_Valid then
              Clip EM circle arc.
```

```
            end if
        elsif Right_Intcpt_B_Valid then
            if Bot_Intcpt_R_Valid then
                Clip EM circle arc.
            end if
        end if
    end if
else
    Set Em Arc 1 and 2 to Invalid
end if
else
    Set Em Arc 1 and 2 to Invalid
end if  -- if EM center is in view
If EM circle arc length is less than 11.4 inches,
    draw entire arc with one directive.
    Convert arc length from fer to screen units.
    Draw EM circle arc.  Em Clean or EM Speed Brakes
else
    EM circle arc length is greater than or equal to 11.4 inches,
    so multiple directives may be needed in order to draw entire arc.
    Draw 11.4 inches of EM circle arc.  Em Clean or EM Speed Brakes.
    Subtract 11.4 inches from EM circle arc length.
    while Arc is left to be drawn loop
        If remaining EM circle arc length is less than 11.4 inches then
            Convert remaining arc length from fer to screen units.
            Draw entire remaining arc with one directive.
        else
            Draw 11.4 inches of remainder of EM circle arc.
        end if
        Bump EM circle directive Index.
```

Subtract 11.4 inches from remaining EM circle arc length.

end loop end if

- The processing of new EM circle data is load-leveled. New data for one EM circle is processed on each pass, the other EM circle is just adjusted for aircraft motion.

Get the EM circle center position from the last map update.
Rotate/translate EM circle center
establish view boundaries is in fer
if EM clean data was processed on last pass then
   if EM brakes radius is valid then
      process new EM brakes data
   end if
   if EM brakes ARC is in view then
      draw EM speed brakes circle
   end if
   adjust old EM clean circle for aircraft motion
   Set flag to process EM clean during next cycle
else
   adjust old EM brakes circle for aircraft motion
   if EM clean radius is valid then
      process new EM clean data
   end if
   if EM Clean ARC is in view then
      draw EM Clean circle
   end if
   Set flag to process EM speed brakes during next cycle
end if
else

```
                EM Fix not detected.  Place returns in EM Circles Display Tables.

end if
```

It is thought that the method and apparatus of the present invention and many of their attendant advantages, will be understood from the foregoing description, and it will be apparent that various changes may be made in the form, construction and arrangements of the parts and steps thereof, without departing from the spirit and scope of the invention, or sacrificing all of their material advantages, forms herein before being merely preferred or exemplary embodiments thereof. It is the intention of the impending claims to cover all of such changes.

We claim:

1. An apparatus for displaying energy management circles comprising:
    means for defining energy management circles and generating an output signal;
    means for displaying video signals;
    means for processing said output signal to produce said video signal; and said means for processing said output signal also for making a determination of view boundary intercepts of an energy management circle with a display device and furthermore for making a determination of the conacave and alternatively the convex nature of the energy management circle and for generating video signals for the segments of the energy management circle located between the view boundary intercepts based on a result of the prior determination of view boundary intercepts and the determination of the concave and alternatively the convex nature of the energy management circles;
    WHEREBY, the video signals for the segments between boundary intercepts are generated without the need for individual independent inquiries for each intermediate line point of an energy management circle, the inquiries being whether each line point is on the means for displaying, thereby increasing the speed of generation of the video signals and consequently reducing annoying ratcheting of the energy management circle.

2. An apparatus of claim 1 wherein said means for defining comprises a flight management system.

3. An apparatus of claim 2 wherein said means for displaying comprises a cathode ray tube.

4. An apparatus of claim 2 wherein said means for displaying comprises a liquid crystal display.

5. An apparatus of claim 2 wherein said means for displaying comprises a TFEL display.

6. A method of displaying energy management circles on an electronic flight instrument system display of the type having a viewing screen having view boundaries, where the circles have rapidly varying radii and centers; the method comprising the steps of;
    generating and defining an energy management circle having a radius, a center, and a plurality of circle segments each including a plurality of circle points;
    making a determination of circle points on said energy management circle which are intercepts with said view boundaries;
    making a determination of at least one on screen circle segment which is to be drawn on the viewing screen, said on screen circle segment having end points which are intercepts of the view boundaries;
    making a determination of a direction of curvature of said on screen circle segment; and,
    generating video signals for each of said circle points in said on screen circle segment as a result of the prior determination of circle points, the prior determination of at least one on screen circle segment and the prior determination of a direction of curvature.

* * * * *